United States Patent [19]

Merkl

[11] 4,012,487
[45] Mar. 15, 1977

[54] PROCESS FOR THE REMOVAL OF $SO_2$ FROM A STACK GAS

[76] Inventor: George G. Merkl, 46 Sunset Court, Haworth, N.J. 07641

[22] Filed: July 22, 1975

[21] Appl. No.: 598,170

Related U.S. Application Data

[63] Continuation-in-part of Ser. No. 346,772, April 2, 1973, which is a continuation-in-part of Ser. No. 86,364, Nov. 2, 1970, abandoned, and a continuation-in-part of Ser. No. 515,311, Oct. 16, 1974, abandoned, which is a continuation of Ser. No. 238,290, March 27, 1972, abandoned.

[52] U.S. Cl. .............................. 423/242; 423/522; 252/190
[51] Int. Cl.$^2$ ................. C01B 17/00; C01B 17/72; C09K 3/00
[58] Field of Search .......................... 423/242–244, 423/626, 628, 522; 252/190

[56] References Cited

UNITED STATES PATENTS

| 2,746,842 | 5/1956 | Block et al. ....................... 423/626 |
| 3,761,570 | 9/1973 | Lowicki et al. .................... 423/242 |

FOREIGN PATENTS OR APPLICATIONS 769,026   2/1957   United Kingdom

*Primary Examiner*—Oscar R. Vertiz
*Assistant Examiner*—Gregory A. Heller
*Attorney, Agent, or Firm*—Arnold, White & Durkee

[57] ABSTRACT

A stack gas, generally from a sulfuric acid plant, containing $SO_2$, is contacted with an absorptive medium prepared by wetting at least the surface of a first metal selected from aluminum, magnesium and manganese with a second metal selected from mercury, indium, gallium and alloys of indium/gallium and contacting the wetted first metal with $SO_2$, in a solvent medium in the presence of an excess of hydrogen ions until the first metal erodes and is taken up by the solution as a result of the reaction which takes place. The absorptive medium thus formed has the ability to absorb $SO_2$ at lower temperatures and thereafter desorb $SO_2$ at increased temperature and/or with inert gas stripping. The $SO_2$ enriched gas stream obtained as a result of the desorption process can be recycled to the sulfuric acid plant.

29 Claims, 1 Drawing Figure

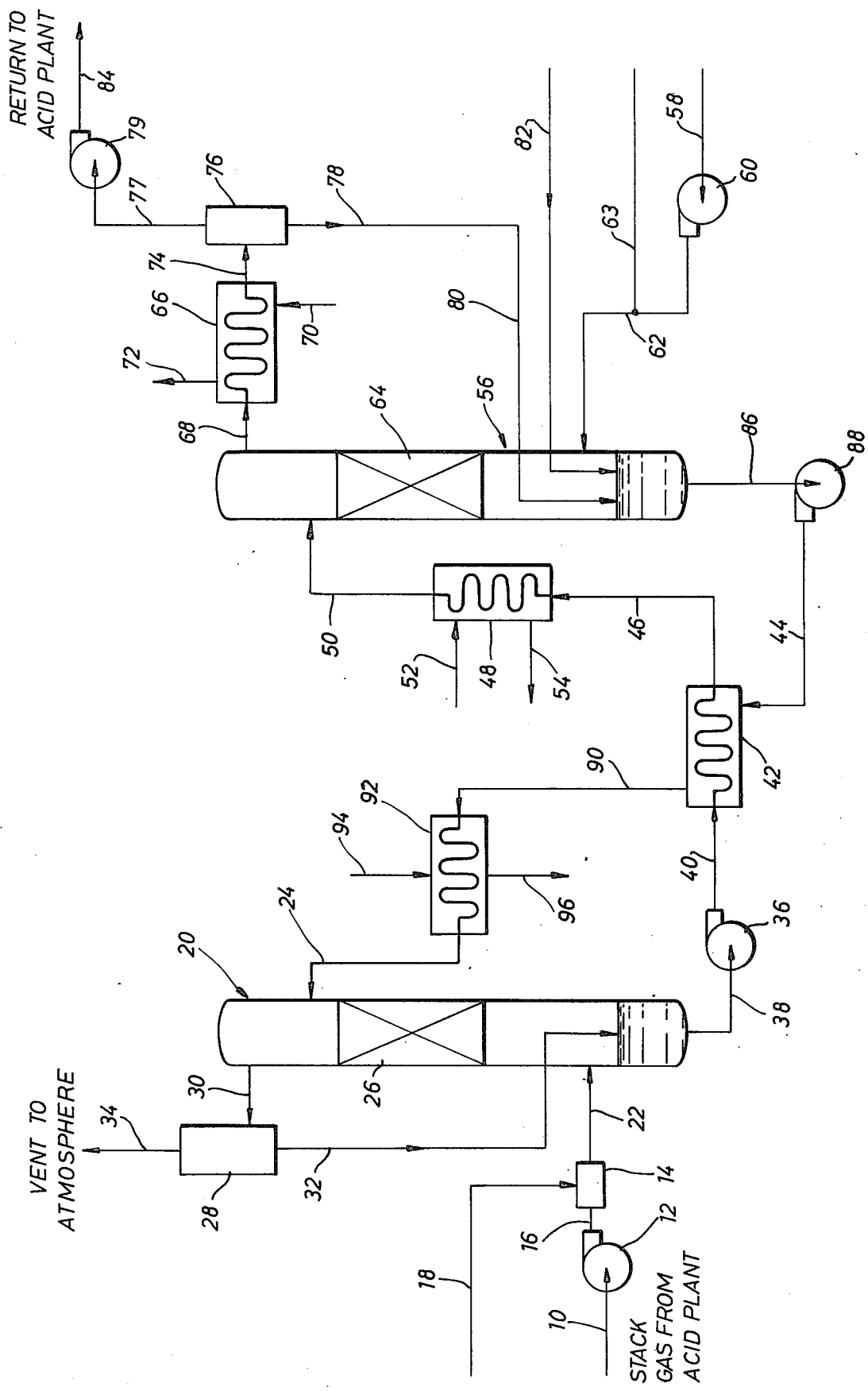

PROCESS FOR THE REMOVAL OF SO₂ FROM A STACK GAS

RELATED APPLICATIONS

This application is a continuation-in-part of application Ser. No. 346,772 filed Apr. 2, 1973, which application is a continuation-in-part of abandoned application Ser. No. 86,364 filed Nov. 2, 1970. This application is also a continuation-in-part of application Ser. No. 515,311 filed Oct. 16, 1974, and now abandoned, which application is a continuation of abandoned application Ser. No. 238,290 filed Mar. 27, 1972. The subject matter of this application is also related to that of application Ser. No. 497,560 filed Aug. 15, 1974.

BACKGROUND OF THE INVENTION

This invention relates to a process for the removal of $SO_2$ from a stack gas, particularly the stack gas of a sulfuric acid plant. More particularly, this invention relates to such a method for the removal of $SO_2$ from a stack gas, employing an absorptive medium which provides for cyclic absorption/desorption of $SO_2$. The present invention also relates to such cyclic process and the absorptive medium and method of producing the same.

Due to the ever increasing concern about air pollution, attention has been directed in recent years toward the development of processes to reduce the pollutants introduced into the atmosphere from various chemical processes. One of the chief pollutants to the atmosphere is sulfur dioxide, which is present in the stack or flue gases from various chemical sources. For example, $SO_2$ is the chief pollutant vented to the atmosphere in the production of sulfuric acid. Also, combustion fumes, particularly those from power plants fed with fuel oil or other sulfur containing fuels or from incinerators from which sulfur containing compounds are burned contain substantial proportions of $SO_2$.

Taking as an example the pollutant emissions from a sulfuric acid plant, the emissions, principally $SO_2$, depend upon a number of factors such as plant design, skill in operation of the plant, efficiency of the catalyst used in sulfuric acid production, completeness of recovery operations and the ability of special devices and systems to reduce the emissions. Most of the work which has been carried out recently has been directed toward optimization of this last factor, i.e. the development of an effective system which can treat the emissions from the sulfuric acid plant or similar plant to reduce the amount of pollutant which is eventually vented to the atmosphere. While substantial work has been carried out, the development of an efficient and economical commercial process is still seen as a desirable end, not fully achieved prior to the development of the present invention.

Sulfuric acid is typically produced in a sulfuric acid contact plant, although some sulfuric acid is produced in chamber plants. Each type produces a stack gas or flue gas with considerable $SO_2$ impurities. The contact process for the production of sulfuric acid generally involves the continuous combustion of sulfur in a combustion chamber, referred to as a sulfur burner or furnace. Combustion air for the furnace is usually taken directly from the atmosphere into a blower and discharged to a drying tower with 93 to 99% sulfuric acid used as the drying agent. The dry air which then contains about 3 mg. water per cu. ft. goes directly into the sulfur burner for the combustion of the sulfur. Generally, contact plants of this type operate at pressure of 2 to 6 p.s.i.g. depending on the plant design, rate of operation and efficiency of the equipment. This pressure gradient decreases as the gas passes through the plant until it is substantially atmospheric at the exit stack.

Generally, the gas leaving the combustion chamber contains 8 to 11% sulfur dioxide by volume. any hydrocarbons which are present in the sulfur fuel are burned to carbon dioxide and water. Generally, the gases from the combustion chamber are cooled and filtered to remove dust.

The cooled sulfur dioxide gas is then introduced into a solid catalyst converter, with the temperature of the incoming gas being predetermined based upon the quantity and quality of the catalyst employed and the composition and flow of the sulfur dioxide gas. This catalyst converter is, of course, utilized to convert the sulfur dioxide to sulfur trioxide. The amount of sulfur trioxide leaving the converter is approximately the same as that of the entering sulfur dioxide. In addition, the exit gas contains oxygen, nitrogen, unconverted sulfur dioxide and traces of moisture and carbon dioxide. The moisture results from the incomplete drying of the combustion air or from burning of hydrocarbons in the sulfur. Trace amounts of carbon dioxide are also introduced from the hydrocarbon combustion.

Generally, the exit gas is cooled prior to introducing this stream into an absorption tower where the sulfur trioxide is absorbed countercurrently in a circulating stream of 98 to 99% sulfuric acid. The sulfur trioxide combines with the water in the acid and forms more sulfuric acid. In the absence of a special device or system to thereafter treat the unabsorbed gas, the gas is vented directly to the atmosphere. It is this gas, containing unconverted sulfur dioxide, which creates substantial pollution problems.

The removal of sulfur dioxide from a gas stream has been proposed and achieved by both chemical and physical methods, using both liquid and solid substances. One difficulty, however, in developing an economic process for the removal of $SO_2$ is that in most instances large volumes of gas containing low concentrations of $SO_2$ must be processed quickly and efficiently to achieve the necessary absorption. This requires the use of a great amount of absorbent material.

Because of the economics involved, commercial processes for $SO_2$ removal have developed along two lines, the first is one in which the absorption of $SO_2$ into some liquid or solid system provides a saleable by-product. The other is a cyclic absorption/desorption process in which the liquid or solid absorbent can be regenerated and reused. For the most part, however, the processes proposed for the removal of $SO_2$ and conversion to a by-product are expensive and the costs of removal are rarely if ever recovered in converting the $SO_2$ to a useful by-product. This is particulArly true where the amount of $SO_2$ in the stack or flue gas is too low to make sulfur recovery operations feasible. As a result, more recent attention has been directed towards attempts to economically remove $SO_2$ from the stack or flue gas without the benefit of by-product recovery, such as through a cyclic absorption/desorption process.

The greatest percentage of processes which are proposed for the removal of $SO_2$ involve contacting the sulfur dioxide containing gas stream with an aqueous absorbent stream which typically contains materials which chemically or physically react with the $SO_2$ in order to absorb the same into the liquid solution. A widely proposed and examined system involves the use of a solution of an alkaline reagent such as an ammonium, alkali metal or alkaline earth metal, hydroxide or carbonate which reacts with the $SO_2$ in the gaseous stream to produce a rich absorbent stream containing the corresponding sulfite and/or bisulfite compound. While this simple concept of scrubbing an $SO_2$-containing gas with an aqueous absorbent containing an alkaline reagent has many advantages, including simplicity and fairly high effectiveness, widespread adoption of this technique for the elimination of $SO_2$ pollution has been greatly inhibited due to the lack of an economical and efficient continuous regeneration procedure for the rich absorbent stream.

While various cyclic processes have been proposed and certain cyclic processes have been utilized for $SO_2$ removal, the development of an economical and efficient absorption process coupled with an economical and efficient desorption process has been a problem which continues to plague environmentalists concerned with $SO_2$ pollution. This problem, however, has now been eliminated through the process of the present invention.

SUMMARY OF THE INVENTION

The process of the present invention provides an efficient and economical means for the removal of $SO_2$ from an $SO_2$-containing gas, typically the stack gas of a sulfuric acid plant. This is achieved in accordance with the present invention through the use of an absorptive medium which is stable, substantially non-corrosive, substantially non-toxic, and, most importantly, capable of both absorption and desorption of $SO_2$ at low temperatures and pressures.

It is a unique feature of the present invention that the absorptive medium which is to be used in the process of removing $SO_2$ from gases containing $SO_2$ is itself prepared using $SO_2$ as one of the essential reactants. Thus, while the process of the invention has as its main advantage the capability of removing $SO_2$ from gas streams in quantities heretofore not economically possible and thereafter permitting effective recovery of the $SO_2$ for further commercial use, it is an additional advantage of the invention that the absorptive material utilized may be prepared, if desired, directly at the site of the $SO_2$ absorption facility.

In accordance with the process of the present invention $SO_2$ is removed from an $SO_2$-containing gas by contacting the gas in an absorption zone with an absorptive medium which has been prepared by the steps of:

1. Wetting the surface of a first metal selected from aluminum, magnesium and manganese, preferably aluminum, with a second metal selected from mercury, indium, gallium and alloys of indium/gallium, in the presence of a source of protons until at least the surface layer of the first metal has been permeated with the second metal so as to form an activated first metal, and 2. Thereafter contacting this activated first metal with $SO_2$ in a solvent medium and in the presence of an excess of hydrogen ions until the activated metal is taken up by the reaction taking place and goes into solution as a component of a soluble inorganic material which is formed in situ. In the preferred embodiment, the second metal is mercury and the activated metal is prepared by contacting aluminum metal with mercury in the presence of an excess of hydrogen ions.

During the preparation of the absorptive medium, the pH of the aqueous medium is maintained within the range of from about pH 0.5 to about pH 4.0. This is effectively done by regulating the flow of $SO_2$ through the aqueous medium, whereby the $SO_2$ flow and hydrogen evolution produced as a result of erosion of the reactive metal are substantially matched. The temperature of the aqueous medium is maintained below about 140° F.

The principal component of the absorptive medium is a water soluble material which appears to be a complex of inorganic polymers, the structure of which includes the first metal, e.g. aluminum, sulfur and hydrogen in the form of SH groups, and chains of sulfur atoms. The term "inorganic" is used to indicate that there are no carbon atoms present in the polymer structure. It is believed that the stability of the SH groups and the capability of the long chain sulfur groups to react with $SO_2$ is responsible for the absorptive capabilities of the absorptive medium.

To carry out absorption in accordance with the present invention, the $SO_2$-containing gas, generally the stack gas of a sulfuric acid plant, is brought into absorptive contact with the absorptive medium of the present invention. This is conveniently achieved by utilizing typical gas-liquid contact apparatus such as a multiplate or packed tower. The contact between the $SO_2$-containing gas and the absorptive medium is carried out in an absorption zone maintained within the range of about 40° F. to about 110° F. Gas flow-rates are adjusted for maximum efficiency according to state-of-the-art procedures. An absorptive medium enriched with $SO_2$ is withdrawn from the absorption zone and conducted to a desorption zone where the $SO_2$-enriched absorptive medium is subjected to desorption.

It is a very valuable feature of the invention that the $SO_2$ can readily be released from the absorptive medium with which it has combined by simple physical treatment. Such desorption can be achieved, e.g., by heating the $SO_2$-enriched absorptive medium to a temperature within the range of from about 120° F. to about 160° F. with or without the assistance of an inert stripping gas, such as air, or even by gas stripping with no heating. At temperatures below about 180° F. the absorptive material releases the $SO_2$ which has been absorbed without any breakdown of the polymer structure. Therefore, the effectiveness of the material for absorption purposes is regenerated.

Preferably, both air stripping and heating are employed to desorb the $SO_2$ from the $SO_2$-enriched absorptive medium. In the most preferred embodiment of the present invention, a temperature differential of from about 75° F. to about 100° F. is maintained between the absorption zone where the $SO_2$ is absorbed by the absorptive medium and the desorption zone where the $SO_2$ is desorbed.

Desorption of the $SO_2$ from the $SO_2$-enriched absorptive medium provides an $SO_2$-enriched gas stream which can be recycled back to the sulfuric acid plant. Preferably, this $SO_2$-enriched gas stream is introduced into the drying tower ahead of the sulfur or sulfur bearing compound furnace. In this way, the $SO_2$ which is removed from the stack gas of the sulfuric acid plant can be used for conversion to additional sulfuric acid. Additionally, the desorption provides an absorptive medium leaner in $SO_2$. This can be returned to the absorption zone for reuse in absorbing additional $SO_2$ from the sulfuric acid plant stack gases.

BRIEF DESCRIPTION OF THE DRAWING

The FIGURE in the accompanying drawing is a schematic illustration of an absorption-desorption process according to the present invention for the removal of $SO_2$ from a sulfuric acid plant stack gas.

DETAILED DESCRIPTION OF THE INVENTION

In accordance with the process of the present invention, $SO_2$ is removed from an $SO_2$-containing gas by contacting the gas in an absorption zone and for a suitable period with an absorptive medium prepared according to the following process:

A first metal, selected from aluminum, magnesium and manganese, is contacted with a second metal selected from mercury, indium, gallium and alloys of indium/gallium to an extent such that at least the surface of the first metal is wetted with the second metal;

The thus-wetted first metal is thereafter contact with $SO_2$ in the presence of an excess of hydrogen ions and in a medium which is a solvent to the material being formed in the ensuing reaction.

As will be explained in more detail hereinafter, when the first metal which has been wetted with the second metal is exposed to a source of hydrogen ions, the first metal becomes activated, which is a preliminary to its entering into the formation of the inorganic polymeric complex which is the principal active component of the absorptive medium of the present invention. When the activated metal is exposed to $SO_2$ in water, finally resulting in a pH less than about 4.0, and at temperatures below about 140° F., a reaction takes place involving the activated metal, sulfur and hydrogen. This reaction results in the production of an inorganic polymeric complex which, in dissolved form, comprises the absorptive medium of the present invention.

The absorptive medium may be formed in situ as a preliminary to the $SO_2$ absorption process by exposing preformed activated first metal to highly concentrated $SO_2$ gas as a first step. After a suitable residence time, which may be determined as will be more fully explained infra (as by monitoring the specific gravity of the solution until it has reached a value of between about 1.05 and 1.50), introduction of the concentrated $SO_2$ may be discontinued and the absorption process carried forward. Alternatively, the absorptive medium of the present invention may be prepared independently of the absorption process.

As a further alternative, activation of the first metal may be carried out simultaneously with production of the absorptive medium. This may be accomplished by merely wetting the first metal with the second metal and thereafter exposing the thus-wetted metal to hydrogen ions as they are generated in production of the absorptive medium.

The invention will be more fully described and the preferred embodiments set forth in the paragraphs which follow.

Preparation of Activated Aluminum

A key reactant in the preparation of the absorptive medium to be used in the process of the present invention is a first metal, e.g. aluminum metal, which has been activated. By "activated" is meant that the intercrysalline structure of the aluminum is made uniquely and exceptionally receptive to molecular polymerization reaction as will be described hereinafter. A more thorough description of the first metal activation technique as well as an explanation of the physico-chemical phenomena which occur during activation is contained in copending application Ser. No. 497,560, which is hereby incorporated by reference.

Basically, activation of the aluminum is carried out by wetting the surface of the aluminum in the presence of a source of hydrogen ions (protons) with a second metal selected form mercury, indium, galliun and indium/gallium alloys until at least the surface layer of the aluminum has been permeated with the second metal. Evidence has been developed to establish that during this permeation of the aluminum in preparation of the activated metal the grain boundaries of the aluminum are actually penetrated by atoms of the second metal. This appears to create a realignment of the aluminum grain boundaries which has the effect of opening up the domains within the aluminum metal, resulting in unique reactivity properties.

The activated aluminum which is utilized in the preparation of the absorptive medium for use in the process of the present invention shows many unique characteristics when compared with the base untreated aluminum metal. One of these is the erosion of the aluminum and release of hydrogen atoms when placed in a liquid medium containing a source of hydrogen ions, e.g. water. It is this feature which is taken advantage of in the present invention and which allows for the production of a novel absorptive medium with the activated aluminum.

In preparing the activated aluminum, aluminum metal in the form of relatively small rods or bars is generally utilized. Preferably, soft ingot grade aluminum metal having a purity of at least 99% by weight is used. The use of an aluminum metal with a substantial percentage of impurities is disadvantageous in the present invention in that activation requires substantially longer periods of time. More importantly, there is the tendency for the impurities to enter into and precipitate from the subsequently formed absorptive medium. Generally, however, the impurities are removed from the aluminum during extended periods of activation.

Using as an example the aluminum-mercury system, activation of the aluminum can be effectively carried out by floating an aluminum bar or rod on mercury in the presence of a hydrogen ion donating medium. This hydrogen ion donating medium can be an aqueous inorganic or organic acid, an aqueous alkaline solution or an alcohol, etc. In principle, any hydrogen ion source or hydrogen ion donating medium can be utilized. It is hypothesized that the mercury is caused to penetrate and diffuse through the aluminum in the form of a stable hydride formed in situ by the reaction between the mercury metal and hydrogen ions of the hydrogen ion donating medium. The ability of mercury, indium and gallium to act in a similar fashion appears to be associated with the hydride-forming capabilities of these metals and the fact that each of these metals has an atomic volume similar to that of hydrogen itself. This allows the metals to penetrate and diffuse through the aluminum either together with hydrogen or in the form of the hydride.

As will be apparent to those skilled in this art, the length of time required for activation of the aluminum with mercury will depend upon many factors, including the exposed surface area, which is related to the hardness of the aluminum, and the amount of impurities present in the aluminum. Longer times are required for harder aluminums and those with greaer impurity contents. As a general rule, adequate activation of aluminum rods with mercury can be achieved in a time period of from about two hours to about 24 hours. When utilizing a preferred soft ingot grade of aluminum, activation can be achieved in a period of from 8 to 12 hours.

When the aluminum is activated, it becomes embrittled and can be easily broken, using a snapping action. By breaking the aluminum and examining the grain structure at the break, one can determine the degree to which the mercury has penetrated and diffused throughout the aluminum. In accordance with the preferred embodiment of the present invention, the absorptive medium is prepared utilizing activated aluminum in which the mercury, indium, gallium or indium/gallium alloy has penetrated and diffused entirely throughout the aluminum structure. As will be discussed hereinafter in connection with the preparation of the absorptive medium, the use of such an activated metal provides for optimum hydrogen atom or ion evolution and, therefore, optimum absorptive medium development.

In forming the activated aluminum, high temperatures should be avoided since high temperatures appear to prevent grain structure realignment. Generally, the activation of aluminum with mercury can be carried out under ambient temperature conditions, with a temperature in the range of from 40° F. to 100° F. being preferred. When utilizing gallium as the second metal, it is often desirable to gently heat the gallium in order to maintain the gallium in the liquid state, thereby allowing the permeation to more effectively take place. Here again, however, excessive temperatures should be avoided.

When forming the activated aluminum using indium, gallium or an indium/gallium alloy, the permeation and diffusion of the indium and/or gallium through the aluminum rod may be initiated merely by contacting one end of the aluminum rod with the indium and/or gallium. The initiation of diffusion may be observed by noting the surface wetting of the aluminum with the indium and/or gallium above the point of contact. Further diffusion of the indium and/or gallium through the entirety of the aluminum can then be continued by placing the aluminum rod in an anhydrous organic liquid medium such as alcohol, benzene, or the like, which is capable of donating hydrogen ions for effecting further diffusion. A material such as benzene is acceptable as a source of hydrogen ions due to the high activity of the already activated aluminum.

With respect to the indium/gallium alloys which may be used, essentially any alloy composition will be suitable, ranging from 90% by weight gallium and 10% by weight indium to 10% by weight gallium and 90% by weight indium. When employing such alloy, however a 50:50 weight mixture of gallium alloy and indium is extremely effective.

The amount of mercury, indium and/or gallium which penetrates and diffuses through the aluminum will depend, of course, upon the length of treatment. As previously mentioned, it is preferred in accordance with the present invention to employ an activated aluminum in which the mercury, indium and/or gallium has penetrated entirely through the aluminum. Aluminum which has been "totally" activated in this manner erodes with the greatest efficiency when placed in contact with a source of hydrogen ions and extracts the greatest amount of hydrogen atoms.

Generally, ingot aluminum will pick up a maximum of about 5% by weight of mercury during the activation process, with typical pickups being in the 2.5 to 3.5% by weight range. This amount of mercury is very effective to achieve the desired results of the present invention. Even with much smaller amounts of mercury, however, e.g. amounts as low as 0.1%, the aluminum becomes activated and can be used to produce the unique absorptive medium of the present invention. Since hydrogen atom extraction, however, is greatly reduced with the reduction in the mercury content of the activated aluminum, it is preferred to operate with a mercury content within the above specified range of about 2.5% to about 3.5% by weight.

It has generally been found that an aluminum activated with indium and/or gallium is more active than the mercury-activated aluminum. For this reason, the amount of indium and/or gallium required to achieve suitable activation is less than the amount of mercury required. Generally, the aluminum will pick up a maximum of about 3% by weight indium and/or gallium. However, suitable activation can be achieved with as little as about 0.05 to about 1.0% by weight indium and/or gallium and it is preferred to utilize an amount in this range. However, it has been found that even with amounts of indium and/or gallium as low as 0.01% by weight, very active aluminum effective for the production of the absorptive medium can be provided.

The above discussion deals only with the preferred techniques for activation of aluminum and the use of this activated aluminum in the production of the absorptive medium according to the present invention. However, it may not be necessary to utilize a pre-formed activated aluminum to produce the absorptive medium. Rather it appears that all that may be required is that the aluminum metal be surface wetted with the mercury or indium and/or gallium prior to insertion into the aqueous medium for formation of the absorptive medium. It is hypothesized that with such surface wetting, activation of the aluminum and penetration of the mercury or indium and/or gallium through the aluminum takes place in situ during the production of the absorptive medium. For example, it is hypothesized that when the sulfur dioxide is bubbled into the aqueous medium, the hydrogen ion donating medium at proper pH is created, providing the proper atmosphere for activation of the aluminum. When this activation occurs in situ, the aluminum will then begin to erode and evolve hydrogen which will have a similar effect on absorptive medium production.

The surface of the aluminum can be wetted, for example, with mercury, using a typical amalgamation technique wherein the surface of the aluminum rod is first cleaned, such as with sodium hydroxide, and the clean surface of the aluminum brought into immediate contact with mercury metal. This can be done, for example, by holding the aluminum under a pool of mercury with agitation. In this way, the aluminum will become wetted with the mercury in those areas where an oxide film has insufficiently formed. This wetted aluminum will not have the overall metallic mercury shiny appearance of aluminum pre-activated in accordance with the preferred technique described above. However, during the production of the absorptive medium, the appearance of the wetted aluminum will take on the same appearance as the preformed activated aluminum, and, presumably, a similar species will result. Accordingly, as used throughout this application, the expression "aluminum at least the surface of which has been wetted with a metal selected from mercury, indium, gallium and indium/gallium alloys" is meant to embrace both the activated aluminum species preferably utilized in accordance with the present invention as well as an intermediate species which apparently becomes activated in situ during formation of the absorptive medium.

Preparation of Absorption Medium

The activated aluminum described above is utilized in accordance with the present invention to prepare an absorptive medium which is effectively used in the process of the present invention for the absorption of $SO_2$ from a stack gas, particularly sulfuric acid plant stack gas, with subsequent desorption of the $SO_2$ from the absorptive medium. As indicated above, while the absorptive medium can be produced by utilizing aluminum at least the surface of which has been wetted with mercury, indium, gallium or an indium/gallium alloy, it is preferred to utilize a preformed activated aluminum such as previously described. The activated aluminum is placed in an aqueous medium and preparation of the absorptive medium is initiated by flowing $SO_2$ gas through the aqueous medium. This can be conveniently achieved by utilizing a system wherein $SO_2$ gas is bubbled from a source such as a porous frit, on the like, located beneath the activated aluminum. This assures adequate contact between the $SO_2$ gas and activated aluminum in the upward travel of the $SO_2$ through the aqueous medium.

The environment created by bubbling $SO_2$ through the aqueous medium effects an erosion of the aluminum and a liberation of hydrogen, a phenomenon which is apparently unique to the activated metal, alone, and which does not occur if the aluminum has not first been activated. In turn, the liberated hydrogen atoms appears to react with the $SO_2$ gas molecules, liberating oxygen in the process and forming SH groups which, in turn, react with the eroding aluminum. It is hypothesized that a monomeric unit is thus formed between the aluminum, hydrogen and sulfur atoms, which continues to grow into a polymer by the continuous formation and attachment of additional monomeric units. Also the SH groups dissolve any elemental sulfur formed.

The structural formula of this polymer and the precise chemical constitutency thereof have not been confirmed. However, it has been hypothesized from the apparent reaction mechanism that the polymer contains a repeating monomeric unit of the following formula:

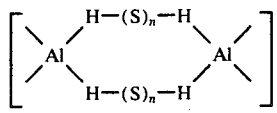

where $n$ is a number ranging from 2 to 9.

Polymeric materials are inherently complex. This is particularly true where the monomeric component is formed in situ, as is the case in the present invention. Thus, the polymeric materials contained in the absorptive medium of the present invention will vary in such characteristics as molecular length and number of sulfur groups.

Furthermore, as will be evident from the following discussion, in addition to the polymeric component in the absorptive medium, it is quite likely that the absorptive medium will contain other components in the form of nonpolymeric materials and salts. It should be understood that the expression "absorptive medium" as used throughout this disclosure embraces the dissolved complex of inorganic polymers formed in the process of the present invention with or without these other non-essential soluble materials.

As indicated by the above proposed formula, the inorganic polymeric complex comprises aluminum, sulfur and hydrogen in the form of SH groups, and chains of sulfur atoms. The polymeric nature of this material has been determined analytically, with a film-forming material resulting upon evaporation of the absorptive medium. Moreover, the presence of aluminum, sulfur and SH groups in the absorptive medium can be readily determined.

In general, the nature and structure of the absorptive medium will depend upon many reaction parameters, including the temperature and pH at which the reaction is carried out. In addition, the preparation of the absorptive medium in accordance with the present invention is dependent upon the erosion of the first metal and liberation of hydrogen atoms to react with the incoming $SO_2$ molecules. This, in turn, is related to the surface area of the activated first metal. All of these parameters will be discussed below.

The preparation of the absorptive medium should be carried out with the intent of minimizing as much as possible the formation of precipitated solids. It has been determined in accordance with the present invention that a substantial amount of elemental sulfur precipitates when the absorptive medium is prepared at a temperature in excess of 140° F. during preparation.

The erosion of the aluminum or other first metal and the formation of the inorganic polymeric complex of the absorptive medium involves an exothermic reaction. Where the heat of the reaction tends to increase the temperature of the absorptive medium above 140° F., cooling should be applied. However, some degree of exotherm is desirable in order to produce a suitable polymeric complex. Therefore, when the reaction parameters are such that an exothermic reaction is not achieved absent an outside stimulus, it is ofen desirable to gently heat the aqueous medium in order to initiate the exothermic reaction. Again, however, in order to produce the most advantageous results, the temperature of the aqueous medium should be maintained below 140° F. In effect, any temperature from below room temperature to 140° F. can be effectively employed in accordance with the present invention, although a temperature of from about 100° to 120° F. is preferred.

In order to achieve the advantages of the present invention, the pH of the aqueous medium must be controlled during preparation of the absorptive medium. The pH of the aqueous medium tends to be lower with increasing $SO_2$ introduction. The most efficient way to control and regulate $SO_2$ introduction as a function of hydrogen evolution so as to tie up the $SO_2$ with hydrogen is to control the flow of $SO_2$ as a function of pH.

The upper limit of the pH should be kept below approximately 4.2. Above this value, aluminum precipitates as the hydroxide, decreasing the transparency of the absorptive medium and providing a substantially inactive component. The precipitation of the aluminum as aluminum hydroxide prevents full utilization of the eroding aluminum in formation of the inorganic polymeric complex. On the other hand, where the pH of the aqueous medium becomes too low, $SO_2$ introduction is too fast for the hydrogen evolution and there is insufficient hydrogen to tie up the $SO_2$, thereby permitting the formation of substantial amounts of sulfurous acid and insoluble and soluble sulfates, sulfites, bisulfites, etc. For this reason, it is advisable to maintain the pH above 0.5. Preferred operation in accordance with the present invention will be at a pH which is maintained within the range of about 2.0 to about 3.0. Again, for any particular system wherein the temperature and hydrogen evolution are set, pH control can be carried out by regulating the inflow of $SO_2$ gas or surface area of the eroding metal.

The rate of hydrogen evolution and aluminum erosion of the activated aluminum is a function of the surface area of the aluminum as well as a function of the amount of mercury, indium, gallium or indium/gallium alloy diffused through the aluminum. In addition, as mentioned above, the hydrogen evolution is a function of the pH of the aqueous medium. All of these parameters, therefore, are interrelated.

In the preferred embodiment of the present invention, half-inch diameter aluminum rods, approximately six inches long, are permeated with mercury to an extent of about 2.5 to 3.5% by weight mercury based on the weight of the rod. These rods are then utilized in an aqueous medium so that the ratio by weight of water to aluminum is from about 2:1 to about 10:1, with a most preferred range being 4:1 to 6:1. The most efficient production of the absorptive medium appears to result with a weight ratio of water to aluminum of about 5:1.

When the amount of water is excessive, the time period for preparation of a suitable absorptive medium becomes great. This is due to the lack of adequate contact between the $SO_2$ and the activated aluminum. In such a system, the pH tends to decrease, resulting in substantial sulfurous acid production. On the other hand, where insufficient water is present, there is a tendency for the inorganic polymeric complex not to completely dissolve, resulting in an absorptive medium which lacks the desirable clarity. Where complete dissolution does occur, there is a tendency for the absorptive medium to become too viscous, thereby reducing the absorption efficiency of the absorptive medium.

The preparation of the absorptive medium is generally carried out until the specific gravity of the system is within the range of about 1.05 to about 1.25. Preferably the specific gravity of the absorptive medium will be about 1.08 to about 1.12. This specific gravity range appears to correspond to shorter sulfur chains in the inorganic polymeric complex and appears to provide greater stability for the absorptive medium. This corresponds roughly to a viscosity-determined average molecular weight for the inorganic polymeric complex of about 10,000 to 15,000. By measuring the specific gravity either through continuous monitoring or by sampling, it is thus possible to conveniently determine an end point for the preparation of the absorptive medium. Suspended solids, if any, should preferably be removed, such as by simple filtration, prior to using the absorptive medium for absorption/desorptive in accordance with the present invention.

When producing the absorptive medium, it is preferred to utilize concentrated $SO_2$, with 100% $SO_2$ being preferred. With lower concentrations, the time period for producing a suitable absorptive medium becomes quite prolonged. In addition, the additional gases, such as oxygen, introduced with the lower concentration $SO_2$ gas stream tend to interfere with proper preparation of the absorptive medium, resulting in the formation of hydroxy and hydroperoxy groups. These should be avoided as much as possible. Accordingly, while any concentration of $SO_2$ will produce the absorptive medium of the present invention, higher concentrations and, in particular, 100% $SO_2$, are preferred. Also, for some purpose it may be advantgeous to blend $H_2S$ with the $SO_2$ gas.

From the above, it should be readily apparent to those skilled in the art that various parameters are controlled in formation of the absorptive medium, one of the most important of which is pH, this parameter being interrelated with the others as discussed above. By controlling the pH and as a result the flow of the $SO_2$ gas, the $SO_2$ can be introduced into the aqueous medium so that the $SO_2$ and sulfurous acid contents do not build up but rather are converted to SH groups by reaction with the evolved hydrogen. In the ideal situation, the amount of hydrogen evolved from the eroding activated aluminum will stoichiometrically match the $SO_2$ introduced, so that no hydrogen or $SO_2$ will be liberated from the reaction system. Rather, each will be tied up in the form of SH groups and sulfur groups in the polymers being found in the absorptive medium. While some elemental colloidal sulfur will undoubtedly be formed in this reaction, this colloidal sulfur will be taken up by the SH groups, this phenomenon being presumed responsible for the buildup of sulfur chains in the monomeric and polymeric structure previously proposed.

The stability of the absorptive medium and the inorganic polymeric complex contained therein is apparently a function of the amounts of sulfate and sulfurous acid generated in the formation process. Where the inorganic polymeric complex is relatively free of these components, the inorganic polymeric complex appears stable at temperatures up to about 180° F. However, the breakdown temperature of the inorganic polymeric complex is somewhat reduced as the concentration of these impurities builds up. For this reason, operation within the parameters outlined above is preferred.

Absorption/Desorption

The absorption medium of the present invention has the unique characteristic of being capable of absorbing $SO_2$ and thereafter being treated for the purpose of desorbing the absorbed $SO_2$ so as to return itself to a state capable for reuse in absorption. Throughout this disclosure, the expressions "absorb" and "absorption" are utilized broadly to refer to the attraction of the $SO_2$ to the absorptive medium and its retention therein. These expressions are not intended to refer particularly to any specific physical or chemical reaction. The expressions absorb and absorption are meant, rather, to include either of these possbilities or combination thereof. In addition, the expression "with combined $SO_2$" is meant to embrace the state in which the $SO_2$ is combined with the absorption medium either physically or chemically.

The absorption in accordance with the present invention is achieved by merely bringing any gas containing $SO_2$ into contact with the absorptive medium of the present invention. This is preferably achieved by using conventional gas-liquid contact apparatus, usually of the type which provides for countercurrent flow between the gas and the absorptive medium, as, for example, a plurality of spaced plates, various other distribution means or more typically a packed column. Such apparatus allows for sufficient residence time between the gas and liquid in order to effectively achieve absorption.

It has been discovered in accordance with the present invention that the absorptive medium absorbs $SO_2$ with greater efficiency at lower temperatures. Accordingly, it is preferred to maintain the absorptive medium at a low temperature during the absorption of $SO_2$. Generally, the temperature of the absorptive medium will be from about 40° to about 110° F., preferably 45° to 75° F.

A unique characteristic of this absorptive medium is its ability to release the absorbed $SO_2$. This desorption can be achieved in several different ways. For example, desorption of the absorbed $SO_2$ can be achieved by stripping with an inert gas. This involves passing the spent absorptive medium, i.e., containing a quantity of combined $SO_2$, in countercurrent contact with a stream of inert gas, such as air. This stream of inert gas picks up the $SO_2$ from the absorptive medium, returning the absorptive medium to its state prior to absorption. It can then be utilized for absorption of additional $SO_2$. Thus, there is provided the capability of recycling the absorptive medium through continuous absorption/desorption cycles.

In addition to stripping with an inert gas, desorption can be achieved by heating the spent absorptive medium with combined $SO_2$ to a temperature at which desorption occurs. For example, this can be achieved by heating the absorptive medium to a temperature within the range of about 120° to about 160° F. Care should be taken, however, to avoid temperatures in excess of 180° F., since at these temperatures there is a tendency for the dissolved material of the absorptive medium to break down, precipitating elemental sulfur. Within the temperature range of 120° to 160° F., however, the $SO_2$ which is combined with the absorptive medium can be effectively desorbed with no adverse effect on the quality of the absorptive medium. The combination of heat with the use of an inert stripping gas will provide the most effective vehicle for desorption of the $SO_2$ from the absorptive medium. Any sulfur which may precipitate will be redissolved by the SH groups of the polymer on standing.

Regardless of which technique of desorption is utilized, an airstream containing $SO_2$ is developed as a result of the desorption process. The $SO_2$ content of this air stream is concentrated as compared with the original stack gas. For example, while the original stack gas may contain up to 3,000 p.p.m. $SO_2$, the $SO_2$-containing airstream exiting from the desorption cycle can contain as much as 13,000 to 15,000 or more p.p.m. $SO_2$. It is, therefore, economical to return this airstream to the acid plant for reuse in the production of sulfuric acid. Accordingly, instead of providing a pollutant to the atmosphere, the process of the present invention makes use of the sulfur dioxide content of the sulfuric acid plant's stack gas in the production of further sulfuric acid.

The process of the present invention will now be described by reference to the accompanying Figure which illustrates a preferred embodiment and best mode contemplated for the removal of $SO_2$ from a sulfuric acid plant stack gas, utilizing the absorption-desorption process of the present invention.

As illustrated in the Figure, the stack gas from a sulfuric acid plant, instead of being vented directly to the atmosphere, is passed through line 10 into a blower 12 where the stack gas is pressurized. Typically the stack gas from the sulfuric acid plant has a concentration of $SO_2$ of from about 1500 to about 3500 or more p.p.m. The stack gas pressurized by blower 12 is passed to a humidifier 14 through line 16. Water is fed to humidifier 14 through line 18 and the stack gas is subjected to humidification treatment in humidifier 14. This humidification can effectively control the temperature of the stack gas, the humidified stack gas generally having a temperature within the range of about 40° to about 110° F.

The humidified stack gas is passed out of humidifier 14 and introduced into absorber 20 through line 22. Absorber 20 is generally operated at a temperature of about 40° to about 110° F. and a pressure of from about 0.2 to about 2 p.s.i.g.

As illustrated in the Figure, the stack gas from the sulfuric acid plant is introduced into absorber 20 through line 22 near the bottom of absorber 20. The absorptive medium in accordance with the present invention is also introduced into absorber 20, the absorptive medium being introduced through line 24 in the upper portion of absorber 20. Contact is achieved between the stack gas flowing upwardly and the absorptive medium flowing downwardly through absorber 20, providing adequate countercurrent contact between the gas and liquid to achieve efficient absorption. This countercurrent contact is carried out in absorption zone 26 which can effectively be a packed or unpacked absorption zone. Where packings are used, the packings can be such typical materials and Raschig rings, Pall rings, Beryl saddles, etc., both plastic and ceramic materials being applicable. As an alternative or addition to such packing, absorption zone 26 can comprise a plurality of trays, such as bubble cap trays and/or can include gas spargers, sprays, etc. In general, any typical gas-liquid contact apparatus capable of effecting intimate contact between the absorptive medium and sulfuric acid plant stack gas can be advantageously utilized in the process of the present invention.

The treated stack gas exits absorber 20 through line 30. This stack gas has the major portion of the $SO_2$ removed in absorber 20 and as a result, the stack gas exiting through line 30 will generally have less than 200 p.p.m. $SO_2$ with less than 150 p.p.m. $SO_2$ being achieved under very satisfactory conditions. Under the most favorable conditions within absorber 20, the treated stack gas exiting through line 30 will have less than 100 p.p.m. $SO_2$. The treated stack gas is withdrawn through line 30 into liquid-gas separator 28. Liquid-gas separator 28 can be of any conventional form, capable of separating the gas and liquid components of the treated stack gas exiting absorber 20 through line 30. This liquid-gas separator 28 can be, for example, a cyclonic or baffled vessel of conventional design. Some of the liquid component within the stack gas is entrained absorptive medium. Any recovered absorptive medium is returned to absorber 20 through line 32 into the pool of absorptive medium at the bottom of absorber 20. The gas separated by liquid-gas separator 28 can be vented to the atmosphere through line 34. The problems of pollution, of course, are greatly minimized due to the reduced $SO_2$ content of the vented gas.

The spent absorptive medium containing combined sulfur dioxide flows from the reservoir at the bottom of absorber 20 to pump 36 through line 38. Stream 40 exiting pump 36 is pressurized up to about 5 to 20 p.s.i.g. The spent absorptive medium in line 40 is generally at a temperature in the range of 40° to 100° F. This spent absorptive medium in line 40 then flows through heat exchanger 42. Heat exchanger 42 can be any type of typically utilized heat transfer device, such as shell and tube heat exchanger. The spent absorptive medium may, of course, flow through the tubes or the shell. Fresh absorptive medium flows through heat exchanger 42 in stream 44 and serves as the coolant. The temperature of this fresh stream of absorptive medium is from about 60° to 100° F.

Stream 46 of spent absorptive medium with combined $SO_2$ leaves heat exchanger 42 at a temperature in the range of 65° to 105° F. and flows in stream 46 to heater 48. Heater 48 can be any conventional heater or heat exchanger of typical design. The spent absorptive medium leaves heater 48 through line 50 at a temperature within the range of about 130° to about 160° F. Of course, where desorption of the spent absorptive medium can be carried out at lower or higher temperatures effectively without degradation of the absorptive medium, heat exchanger 48 can be operated to heat the spent absorptive medium to a temperature outside the above range. The heating medium flowing to heater 48 through stream 52 and exiting through stream 54 may be any hot fluid, such as steam or hot water.

The heated spent absorptive medium exiting heater 48 through line 50 is introduced into desorber 56 near the top. In the preferred embodiment of the present invention, ambient air is also drawn through line 58 by means of blower 60 and introduced into desorber 56 near the bottom through line 62. The pressure of the air in line 62 is generally in the range of about 0.2 to about 2 p.s.i.g. In an alternative embodiment, low pressure steam is fed into line 62 via stream 63. The mixing of air and steam increases the temperature and humidity of the air utilized for stripping the $SO_2$ from the spent absorptive medium in desorber 56. The humid air flows into desorber 56 through line 62 generally at a temperature within the range of 130° to 180° F.

In desorber 56, the hot spent absorptive medium flows countercurrent to the upward flow of hot humidified air through a desorption zone 64. This desorption zone 64 can be similar in structure to absorption zone 26 of absorber 20 or can be any other packed or unpacked zone allowing intimate contact of liquid and gas. Accordingly, the desorption zone 64 can comprise typical packings, bubble cap trays, spargers and/or sprays and the like.

In desorber 56, a substantial percentage of the $SO_2$ which is combined with the spent absorptive medium is removed and withdrawn from desorber 56 through line 68. Generally a small residual equilibrium concentration of $SO_2$ remains combined with the desorbed absorptive medium. The gas leaving desorber 56 through line 68 is principally a mixture of the stripping air and desorbed $SO_2$. This gas mixture is conducted to water vapor condenser 66 which can be a heat exchanger of any conventional design. For example, cooling water can be introduced into condenser 66 through line 70, exiting through line 72. Condenser 66 provides an exit stream 74 which is generally at a temperature within the range of about 80° F. to 100° F. This stream 74 contains stripping air, water vapor, sulphur dioxide and condensate containing a small quantity of sulfur dioxide. This stream is conducted to liquid-gas separator 76 which is similar to liquid-gas separator 28 previously described. The gas phase leaves liquid-gas separator 76 through line 77 and flows through compressor 79. The gas phase leaves the compressor 79 at the pressure within the range of about 4 to 10 p.s.i.g. and can be returned to the acid plant via stream 84. Typically, stream 84 includes stripping air and sulfur dioxide in a much more concentrated form than in the original sulfuric acid plant stack gas, making it economical to return this stream to the sulfuric acid plant. Preferably, stream 84 of air and $SO_2$ is introduced into the sulfuric acid plant in the air drying tower, prior to introduction into the sulfur burning furnace. By introducing $SO_2$ into the air drying tower and subsequently into the furnace, even a more concentrated stream of $SO_2$ can be produced by the sulfur-burning furnace in the sulfuric acid plant.

The liquid phase leaving gas-liquid separator 76 through 78 generally contains very dilute sulfurous acid and a small quantity of the absorptive medium. This liquid mixture flows into the bottom liquid reservoir of desorber 56 through line 80. In addition, makeup water and/or fresh absorptive medium can be added to this reservoir through line 82 to replenish any absorptive medium mechanically lost through entrainment in the gas leaving liquid gas separator 76.

The desorbed absorptive medium leaner in $SO_2$ and ready for reuse leaves the bottom of desorber 56 through line 86 and is pumped by pump 88 through line 44 into heat exchanger 42. This stream of absorptive medium is discharged from pump 88 at a pressure of about 5 to about 20 p.s.i.g. The absorptive medium leaves heat exchanger 42 through line 90 and is introduced into cooler 92. Coolant is introduced into cooler 92 through stream 94 and exits through stream 96. This coolant can be any typically used coolant such as brine, cooling tower water, chilled water, well water or a typical vaporizable refrigerant. The absorptive medium leaves cooler 92 through 24 lines and is introduced into the top of absorber 20. Cooler 92, together with heat exchanger 42, provide a reduction in the temperature of the absorptive medium from its desorption temperature in desorber 56 to the applicable absorption temperature for use in absorber 20.

The present invention will now be described by references to the following specific examples. These examples are presented for purposes of illustration only and the present invention can not be deemed as limited thereby.

EXAMPLE 1-4

Aluminum rods about 3 inches long and 0.62 inches in diameter were contacted with triple distilled mercury at room temperature in the presence of a dilute hydrochloric acid formed by adding four parts distilled water to one part standard 37-38% bottle strength HCl acid. According to the procedure described in co-pending application, Ser. No. 497,560, the rods were thus activated for a period of approximately 24 hours. The rods were then separated into three groups and treated according to the following three examples.

In the following examples, a conventional countercurrent gas absorber unit is utilized. The activated rods are situated next to each other in the center of the column such that a bed approximately 3 inches in depth is formed through which liquid and gas may pass. Liquid, initially distilled water, is circulated from the bottom of the absorber column, through a filter and returned to the top of the column. Gas enters the liquid through a porous frit located several inches below the bed of activated rods. The frit divides the gas into very fine bubbles which rise and pass over and react with the surface of the rods. The liquid recirculation rate is approximately 1 g.p.m. The flow rate of gas (100% $SO_2$), the pH of the solvent system, the duration of the synthesis, and the temperature range during production are controlled as indicated in Table 1. The specific gravity of the absorptive medium resulting from each synthesis is set forth in the final column.

TABLE 1

| Example No. | Flowrate of $SO_2$ (SCFH) | pH range | Temp. range ° F. | Duration of Synthesis (hrs) | Specific gravity of product |
|---|---|---|---|---|---|
| 2 | 0.2–0.375* | 2.4–3.8 | 70–90 | 21 | 1.099 |
| 3 | 0.375 | 1.4–2.1 | 55–90 | 15.5 | 1.17 |
| 4 | 6.7–7.0 | 0.6–2.0 | 65–145 | 2 | 1.18 |

*The $SO_2$ flow is interrupted as necessary to control the lower limit of the pH range.

EXAMPLE 5

This example is carried out to illustrate preparation of the absorptive medium in accordance with the present invention through in situ formation of activated aluminum.

Aluminum rods of 99+% purity are first rinsed in aqueous caustic solution to strip the rods of their oxide coating. This is followed by immediate rinsing in distilled water and drying, after which the rods are quickly immersed in a pool of mercury. The rods are agitated under the mercury to provide optimum aluminum-mercury contact. As a result, approximately 50% of the aluminum surface appears to be wetted by mercury.

The wetted rods are then utilized to prepare absorptive medium using the same procedure as described in Examples 1–4. During absorptive medium production the wetted rods take on the appearance of being overall wetted with mercury and are visually indistinguishable from the activated rods prepared by the process described in co-pending application Ser. No. 497,560.

The absorptive medium prepared appears quite similar to that prepared in Examples 1–4 and, as shown in Examples 6–9, similar absorption/desorption characteristics result.

EXAMPLES 6–9

After each batch of absorptive medium is produced, as in Examples 2–5, it is tested for absorption/desorption capability according to the following procedure:

a. Specific gravity and pH are taken.

b. A 200 ml sample, free of solid material, is desorbed in order to remove all the $SO_2$ which has been taken up into the polymeric complex of the absorptive medium after the absorptive polymeric structure is formed. Desorption is carried out by stripping the sample with air while in a temperature controlled water bath at 158° F. (70° C). The concentration of $SO_2$ is monitored and recorded continuously on chart paper.

c. Specific gravity and pH are taken (after filtration, if necessary) upon completion of the first desorption.

d. A gas blend of 4,200 ppm $SO_2$ in approximately 88% $N_2$ and 12% $O_2$ is passed through the sample in a temperature controlled water bath. The concentration of $SO_2$ leaving the sample is monitored and recorded continuously on chart paper.

e. Specific gravity and pH are taken (after filtration, if necessary) upon completion of the first absorption.

f. The sample is again desorbed with air in step b (at the same temperature).

g. Specific gravity and pH are taken after completion of the second desorption.

h. A gas blend of 4,200 ppm $SO_2$, etc., is passed through the sample as in Step d (at the same temperature).

i. Specific gravity and pH are taken after completion of the second absorption.

j. The average mass of $SO_2$ per unit time emitted during each of the two desorptions and the average mass of $SO_2$ per unit time absorbed during each of the two absorptions are calculated.

The following results occur:

TABLE 2

| Ex. No. | Desorption Temperature ° F. | Absorption Temperature ° F. | Net *Mass Transferred Millimoles | Net *Rate of Mass Transfer Millimoles/Hr | Avg. Net % Removal During Absorption Rate Absorbed / Rate Added | Run Time Hr. | pH After Run | Specific Gravity After Run |
|---|---|---|---|---|---|---|---|---|
|   | 158 | — | 6.08 | 3.98 | — | 1.53 | — | — |
| 6 | — | RT | 10.00 | 3.08 | 89.9 | 3.25 | 3.4 | 1.017 |
|   | 158 | — | 3.113 | 7.67 | — | 4.06 | 3.5 | — |
| 7 | — | 86 | 10.5 | 6.70 | 97.5 | 1.56 | — | 1.07 |
|   | 158 | — | 37.9 | 15.17 | — | 2.5 | 3.4 | 1.13 |
| 8 | — | 86 | 13.5 | 6.84 | 99.3 | 1.98 | — | — |
|   | 158 | — | 71.4 | 22.59 | — | 3.16 | 3.27 | 1.12 |
| 9 | — | 86 | 17.63 | 6.89 | 98.6 | 2.56 | 3.23 | 1.13 |

*In most cases, sufficient time was not allowed for "complete" desorption and a residual mass of $SO_2$ remained in solution when absorption was begun. Since it was determined that desorption can occur from room temperature 160° F., this "residual" mass of $SO_2$ left behind at the desorption temperature could continue to desorb at the absorption temperature. This "residual" $SO_2$, therefore, made it look as if a significant part of the simulated tail gas was not being absorbed. For this reason, this "residual" $SO_2$ was factored out of calculations for the mass transferred during absorption and, hence, the term "net" mass transfer in the tables. The rate was calculated by dividing the mass transferred by the run time.

EXAMPLE 10

This example represents practice of the process of the present invention on a pilot-plantscale, utilizing an absorption/desorption system substantially corresponding to that illustrated in the accompanying figure. The data in this example are scaled up to represent the treatment of a stack gas leaving a 200 short ton/day sulfuric acid plant. The figures are derived from a pilot plant operating on a scale of 1/220th of such full plant capacity.

The stack gas treated in accordance with this example is drawn from a sulfuric acid plant. The temperature of the stack gas is 167° F. at a gauge pressure of 0.5 inches water. The flow of the incoming stack gas in terms of its components in pounds per hour is as follows:

| | |
|---|---|
| Sulfur Dioxide | 222 |
| Nitrogen | 45,125 |
| Oxygen | 5,434 |
| Water | nil |

Prior to introduction into an absorption zone, the stack gas is humidified with water at 70° F., at a pressure of 20 inches $H_2O$. The flow rate of humidifying water is 540 lb./hr.

The humidified stack gas is introduced into an absorption zone for countercurrent flow and contacted with an absorptive medium in accordance with the present invention. This absorptive medium is prepared by bubbling 100% $SO_2$ through as aqueous medium containing activated aluminum rods, the aluminum rods being activated by contact wtih mercury metal in the presence of hydrochloric acid. The specific gravity of the absorptive medium is 1.09.

The absorptive medium flows through the absorption zone in countercurrent contact with the humidified stack gas at a rate of 264,211 lbs./hr. The absorptive medium is maintained at a temperature of 60° F. and 2 p.s.i.g. in the absorption zone.

After absorption, the spent absorptive medium is subject to desorption in a desorption zone at a temperature of 140° F. The desorption zone is maintained at a pressure of 0.5–2 p.s.i.g. with the same flow of absorptive medium as through the absorption zone. As a result of continuous absorption/desorption cycles, steady state conditions are reached in which the gas vented to the atmosphere is characterized by the following: temperature 60° F., pressure 2 inches water and a flow rate of 15 lbs/hr. $N_2$, $O_2$ and $SO_2$. The gas which is withdrawn from the desorption zone for recycle to the sulfuric acid plant is characterized by the following: temperature 90° F., pressure 0 inches water and a flow rate of components in pounds per hour of sulfur dioxide 207, nitrogen 2,699, oxygen 820 and water 103. Due to the high concentration of sulphur dioxide in this gas stream, it can be effectively used in the sulfuric acid-making process.

By applying a material balance to the above values, it is seen that the process of the present invention provides greater than 93% efficiency of $SO_2$ removal.

The foregoing description of the invention has been directed to particular preferred embodiments in accordance with the requirements of the Patent Statutes for purposes of explanation and illustration. It will be apparent to those skilled in this art that many variations and changes may be made in both the technique for preparing the absorptive medium, as well as the process for removing $SO_2$ from gases employing such absorptive medium, without departing from the true scope and spirit of the invention. For example, where the stack gases to be scrubbed of $SO_2$ according to the process of the present invention contain other components, such as nitrogen oxides, which is the case with stack gases from oil burning power plants, it may be necessary to change various process parameters such as temperature and pH in order to obtain maximum recovery. It is applicant's intention in the following claims to cover all equivalent variations of the techniques described above as will be apparent to those skilled in this art and, as such, within the true spirit and scope of the invention.

What is desired to be protected by United States Letters Patent is:

1. A process for removing $SO_2$ from an $SO_2$-containing gas which comprises:
   contacting said $SO_2$-containing gas, in an absorption zone, with a liquid absorptive medium, to thereby absorb the $SO_2$ of said $SO_2$-containing gas and produce an $SO_2$ enriched absorptive medium, said liquid absorptive medium being prepared by contacting, in an aqueous medium:
   a. activated aluminum comprising aluminum metal which has been permeated with a second metal selected from:
      i. mercury;
      ii. indium;
      iii. gallium; and
      iv. indium/gallium alloys; and
   b. A source of $SO_2$, whereby the aluminum of said activated aluminum erodes in said aqueous medium and reacts with the $SO_2$ of said source of $SO_2$ and hydrogen atoms liberated from the aqueous medium by said activated aluminum, to thereby from said absorptive medium.

2. The process of claim 1 wherein said second metal is mercury.

3. The process of claim 2 wherein said liquid absorptive medium is prepared by contacting in an aqueous medium $SO_2$ and activated aluminum prepared by contacting aluminum metal with mercury in the presence of a source of hydrogen ions.

4. The process of claim 1 wherein in the preparation of said liquid absorptive medium the pH of the aqueous medium is maintained within the range of from about pH 2 to about pH 4 by regulating the flow of the source of $SO_2$ gas and the temperature of the aqueous medium is maintained below 140° F.

5. The process of claim 1 wherein the temperature of the absorption zone is maintained within the range of about 40° F. to about 110° F.

6. The process of claim 1 further comprising:
   removing the liquid absorptive medium from the absorption zone after it has become enriched with $SO_2$;
   conducting the $SO_2$ enriched medium to a desorption zone; and
   subjecting said $SO_2$ enriched medium to desorption in said desorption zone to remove $SO_2$ therefrom.

7. The process of claim 6 wherein desorption of $SO_2$ in said desorption zone is carried out by heating said $SO_2$ enriched medium to a temperature within the range of from about 120° F. to about 160° F.

8. The process of claim 7 wherein the temperature of desorption in said desorption zone is maintained at from about 75° F. to about 100° F. higher than the temperature of absorption in said absorption zone.

9. The process of claim 6 wherein desorption of $SO_2$ in said desorption zone is carried out by passing an inert gas through said $SO_2$ enriched medium.

10. The process of claim 9 wherein said inert gas is air.

11. The process of claim 10 wherein said $SO_2$ enriched medium is heated to a temperature within the range of from about 120° F. to about 160° F. during desorption.

12. The process of claim 11 wherein the temperature of desorption in said desorption zone is maintained from about 75° F. to about 100° F. higher than the temperature of absorption in said absorption zone.

13. The process of claim 1 wherein said second metal is mercury and said activated aluminum contains from 0.1 to 5% by weight of said mercury.

14. The process of claim 13 wherein the amount of said mercury is about 2.5% to about 3.5% by weight.

15. The process of claim 1 wherein said metal is gallium, indium or an indium/gallium alloy and said activated aluminum contains from 0.01 to 3% by weight of said second metal.

16. A continuous process for removing $SO_2$ from the stack gas of a sulfuric acid plant and recyling the removed $SO_2$ which comprises the steps of:
  A. conducting a sulfuric acid plant stack gas-containing $SO_2$ to an absorption zone;
  B. contacting said stack gas in said absorption zone with a liquid absorptive medium, said liquid absorptive medium being prepared by contacting, in an aqueous medium:
    a. activated aluminum comprising aluminum metal which has been permeated with a second metal selected from:
      i. mercury;
      ii. indium;
      iii. gallium; and
      iv. indium/gallium alloys; and
    b. a source of $SO_2$, whereby the aluminum of said activated aluminum erodes in said aqueous medium and reacts with the $SO_2$ of said source of $SO_2$ and hydrogen atoms liberated from the aqueous medium by said activated aluminum, to thereby form said absorptive medium, the contact of said stack gas and liquid absorptive medium forming an $SO_2$ enriched medium;
  C. removing said $SO_2$ enriched medium from said absorption zone and conducting said $SO_2$ enriched medium to a desorption zone;
  D. subjecting said $SO_2$ enriched medium to desorption in said desorption zone to form an enriched $SO_2$ gas stream and a liquid absorptive medium leaner in $SO_2$;
  E. returning said liquid absorptive medium leaner in $SO_2$ to the absorption zone for reuse in absorbing additional $SO_2$ from the sulfuric acid plant stack gas; and
  F. introducing said enriched $SO_2$ gas stream into the sulfuric acid plant for conversion to sulfuric acid.

17. The process of claim 16 wherein said second metal is mercury.

18. The process of claim 17 wherein said liquid absorptive medium is prepared by contacting, in an aqueous medium, $SO_2$ and activated aluminum prepared by contacting aluminum metal with mercury in the presence of a source of hydrogen ions.

19. The process of claim 16 wherein in the preparation of said liquid absorptive medium, the pH of the aqueous medium is maintained within the range of from about pH 2 to about pH 4 by regulating the flow of the source of $SO_2$ gas and the temperature of the aqueous medium is maintained below about 140° F.

20. The process of claim 16 wherein the temperature of the absorption zone is maintained within the range of from about 40° F. to about 110° F.

21. The process of claim 16 wherein desorption of $SO_2$ in said desorption zone is carried out by heating said $SO_2$ enriched medium to a temperature within the range of from about 120° F. to about 160° F.

22. The process of claim 21 wherein the temperature of desorption in said desorption zone is maintained from about 75° F. to about 100° F. higher than the temperature of absorption in said absorption zone.

23. The process of claim 16 wherein desorption of $SO_2$ in said desorption zone is carried out by passing an inert gas through said $SO_2$ enriched medium.

24. The process of claim 23 wherein said inert gas is air.

25. The process of claim 24 wherein said $SO_2$ enriched medium is heated to a temperature within the range of from about 120° F. to about 160° F. during desorption.

26. The process of claim 25 wherein the temperature of desorption in said desorption zone is maintained from about 75° F. to about 100° F. higher than the temperature of absorption in said absorption zone.

27. The process of claim 16 wherein said $SO_2$ enriched gas stream is dried prior to introduction into a sulfuric acid plant furnace.

28. A process for removing $SO_2$ from an $SO_2$-containing gas which comprises:
  contacting said $SO_2$-containing gas, in an absorptive zone with a liquid absorptive medium to thereby absorb the $SO_2$ of said $SO_2$-containing gas and produce an $SO_2$ enriched absorptive medium, said liquid absorptive medium being prepared by contacting, in an aqueous medium:
    a. aluminum metal which has been surface wetted with a second metal selected from:
      i. mercury;
      ii. indium;
      iii. gallium; and
      iv. indium/gallium alloys; and
    b. a source of $SO_2$, whereby said scond metal permeates said aluminum in situ, forming an activated aluminum, and whereby the aluminum of said activated aluminum erodes in said aqueous medium and reacts with the $SO_2$ of said source of $SO_2$ and hydrogen atoms liberated from the aqueous medium by said activated aluminum, to thereby form said absorptive medium.

29. A continuous process for removing $SO_2$ from the stack gas of a sulfuric acid plant and recycling the removed $SO_2$ which comprises the steps of:
  A. conducting a sulfuric acid plant stack gas containing $SO_2$ to an absorption zone;
  B. contacting said stack gas in said absorption zone with a liquid absorptive medium, said liquid absorptive medium being prepared by contacting, in an aqueous medium:
    a. aluminum metal which has been surface wetted with a second metal selected from:

i. mercury;
ii. indium;
iii. gallium; and
iv. indium/gallium alloys; and b. a source of $SO_2$, whereby said second metal permeates said aluminum in situ, forming an activated aluminum, and whereby the aluminum of said activated aluminum erodes in said aqueous medium and reacts with the $SO_2$ of said source of $SO_2$ and hydrogen atoms liberated from the aqueous medium by said activated aluminum, to thereby form said absorptive medium, the contact of said stack gas and liquid absorptive medium forming an $SO_2$ enriched medium.

C. removing said $SO_2$ enriched medium from said absorption zone and conducting said $SO_2$ enriched medium to a desorption zone;

D. subjecting said $SO_2$ enriched medium to desorption in said desorption zone to form an enriched $SO_2$ gas stream and a liquid absorptive medium leaner in $SO_2$;

E. returning said liquid absorptive medium leaner in $SO_2$ to the absorption zone for reuse in absorbing additional $SO_2$ from the sulfuric acid plant stack gas; and F. introducing said enriched $SO_2$ gas stream to the sulfuric acid plant for conversion to sulfuric acid.

* * * * *